United States Patent
Shen et al.

(10) Patent No.: US 6,583,971 B1
(45) Date of Patent: Jun. 24, 2003

(54) ELIMINATION OF ELECTRIC-POP NOISE IN MR/GMR DEVICE

(75) Inventors: Yong Shen, Tai Po (HK); Kwok Kam Leung, Yuen Long (HK); Hiroshi Kiyono, Saku (JP); Tetsuo Miyazaki, Nagano (JP)

(73) Assignee: SAE Magnetics (HK) Ltd., Kwai Chung (HK)

( * ) Notice: Subject to any disclaimer, the term of this patent is extended or adjusted under 35 U.S.C. 154(b) by 0 days.

(21) Appl. No.: 09/265,083

(22) Filed: Mar. 9, 1999

(51) Int. Cl.[7] .................................................. G11B 5/39
(52) U.S. Cl. ................... 360/327.22; 322/323
(58) Field of Search ..................... 360/327.22, 327.3, 360/327.33, 327.1, 322, 327.24, 323; 338/32 R; 324/207.21, 252

(56) References Cited

U.S. PATENT DOCUMENTS

| | | | | |
|---|---|---|---|---|
| 3,864,751 A | | 2/1975 | Bealieu et al. ............... 360/113 |
| 4,639,806 A | * | 1/1987 | Kira et al. .................. 360/113 |
| 4,663,685 A | * | 5/1987 | Tsang ........................ 360/113 |
| 5,715,120 A | * | 2/1998 | Gill ............................ 360/113 |
| 5,761,010 A | * | 6/1998 | Mimura ...................... 360/113 |
| 5,800,935 A | * | 9/1998 | Ishi ............................. 428/692 |
| 5,966,272 A | * | 10/1999 | Cain .......................... 360/113 |
| 6,091,589 A | * | 7/2000 | Han et al. ............... 360/327.22 |

\* cited by examiner

Primary Examiner—Brian E. Miller
(74) Attorney, Agent, or Firm—Jenkens & Gilchrist A Professional Corporation

(57) ABSTRACT

The invention relates to a magnetoresistive device comprising: a bottom shield; a top shield; an AMR/GMR device; a first insulating gap layer between said bottom shield and said AMR/GMR; a second insulating gap layer between said AMR/GMR and said top shield; and conductive layer contacting electrically both said AMR.GMR device to siaid bottom shield. Furthermore, similar active devices free of electric-pop noise also be disclosed.

9 Claims, 6 Drawing Sheets

ELIMINATION OF ELECTRIC-POP NOISE IN MR/GMR DEVICE

BACKGROUND OF THE INVENTION

1. Field of the Invention

The present invention generally relates to an active device capable of converting an electrical signal into a voltage, more specifically, to a magnetic recording head consisting of either an anisotropic-magneto-resistive (hereinafter referred as AMR) or giant magneto-resistive (hereafter referred as GMR) sensor along with an insulation spacer and magnetic shields.

2. Description of the Related Art

As is well known in the field, the insulating spacer in an anisotropic magneto-resistive/a giant magneto-resistive device (hereinafter referred to as AMR/GMR) used for magnetic recording is becoming thinner and thinner in order to increase a linear recording density. Inevitably, we are facing electric-pop noise resulting from the thinner spacer. For high manufacturing yield and reliability of electric and magnetic performance, such electric-pop noise must be eliminated.

U.S. Pat. No. 3,864,751 entitled "Induced Bias Magnetoresistive Read Transducer" issued to Beaulier and Napela, on Feb. 4, 1975 proposed that a SAL is isolated from a magneto-resistive device (referred to as MR hereinafter). The patent did not reveal any methods how to make it. Another key point is that the MR and SAL are electrically isolated. In the prior art described by Beaulieu et al., electric-pop noise is present if a thinner insulating spacer (<150 Å), such as $Al_2O_3$, is used. Otherwise, the devices would need a thicker SAL to bias the MR if a thicker insulator spacer (2–400 Å) were used. There are two problems associated with the latter case. Firstly, the SAL can not be easily saturated by a current in the MR and an antiferromagnetic pinning layer must be used to pin the SAL so that the SAL magnetization is perpendicular to the current direction. In this case, the device process becomes very complicated and it also renders designs less extendible to a narrower shield to shield spacing for higher density recording.

The SAL has a function as a shunt bias layer in SAL biased AMR devices. When the MR and SAL are spaced by electric conducting materials, such as Ta, the SAL and MR devices have the same electric track width. These configurations have been disclosed in U.S. Pat. No. 4,663,685 issued in 1987, to C. Tsang, U.S. Pat. No. 4,639,806 issued in 1987 to T. Kira, T. Miyagachi, and U.S. Pat. No. 5,018,037 issued to M. T. Krounbi, O. Voegeli and P. Wang.

SUMMARY OF THE INVENTION

Accordingly, one objective of this invention is to provide an AMR design with a thin insulating spacer free of electric-pop noise.

Another objective is to provide a SAL biased AMR product using an insulated spacer.

A further objective of this invention is to provide an electric active device free of electric-pop noise over an insulating spacer on the top of an electric conductor.

Still another objective of this invention is to provide a design to eliminate electric-pop noise between an AMR/GMR active device and shields.

In accordance with one aspect of the present invention, a magnetoresistive device comprising:

a magnetosresistive layer;

a soft-adjacent magnetic transverse bias layer (SAL);

an insulating layer arranged between said magnetosresistive layer and said magnetic transverse bias layer;

a conductive layer contacting electrically both said magnetosresistive layer and said magnetic bias layer at at least one end region of said SAL element.

In accordance with another aspect of the present invention, a magnetoresistive device comprising:

a first shield;

a second shield;

an AMR/GMR device;

a first insulating gap layer between said AMR/GMR and one of said shields;

a second insulating gap layer between said AMR/GMR and another of said two shields;

a conductive layer contacting electrically said AMR/GMR device to either one of said shields.

In accordance with a further aspect of the present invention, a hard disk driver is provided with the magnetoresistive device.

Compared to the prior art by Tsang, Kire et al and Kroumbi et al, this invention provides an AMR sensor with much improved signal. The signal improvement can be as much as 90% provided that the same MR/SAL device and operating current are used for the device.

Other objects, features and advantages of the present invention will become readily apparent from the following description taken in conjunction with the accompanying drawings.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1b is a cross-section view taken along line AA indicated in FIG. 1a,

DETAILED DESCRIPTION OF PREFERRED EMBODIMENTS

Embodiments according to the present invention will be described in the following.

Figure 1A:
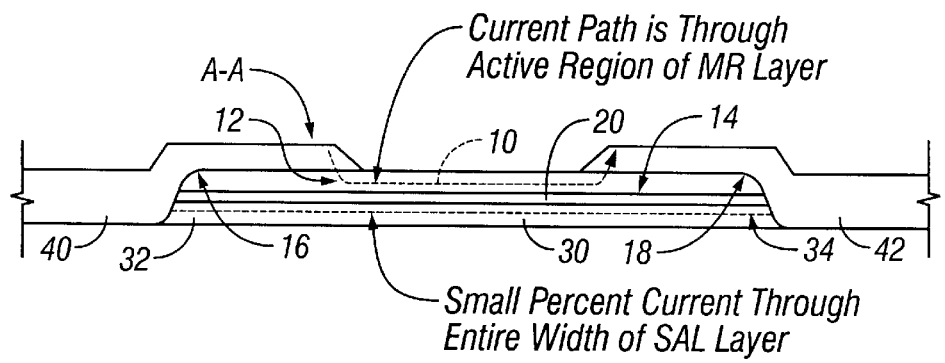
FIG. 1a is a diagram of a preferred embodiment of the invention.

FIG. 1a is a diagram of a first preferred embodiment of the invention. As shown in this figure, MR layer 10 and SAL 30 are separated by a thin insulated spacer layer 20, and are electrically connected at the ends of the MR element. An active region 10 of the MR device could be either a NiFe film or a composite layer, such as TaN/NiFe/TaN. NiFe, thickness ranges from 50 to 400 Å. Side regions 12 and 14 of the MR element make electric contact with longitudinal bias layer and lead layer 40 and 42. End regions 16 and 18 of the MR element are connected to the end regions 32, 34 of SAL by leads. The length of MR element and SAL ranges from 2 to 20 μm. Insulating spacing layer 20 is made of insulating materials, such as $Al_2O_3$, AlON and $SiO_2$, and the typical thickness of insulating spacing layer 20 varies from 50 to 200 Å. Soft-adjacent layer (SAL) 30 can be made of NiFe, NiFeCr, NiFeRh. The moment ratio of SAL 30 to MR layer 10 ranges from 0.6 to 1.0.

In FIG. 1a, longitudinal bias layer 40 can be made of anti-ferromagnetic materials, such as NiMn, FeMn, PtPdMn, IrMn and PtMn. Lead layer 42 can be made of Ta, W or Ta/Au/Ta. Longitudinal bias layer 40 and lead layer 42 extend coverage on top of the MR element 10 and electrically contact with MR element 10 through side regions 12 and 14, respectively. Therefore, the electric track width of the MR element is defined by active region 10 as longitudinal bias layer 40 and lead layer 42 have much higher electric conductivity than the MR layer.

On the other hand, longitudinal bias layer 40 and lead layer 42 electrically contact with SAL layer 30 through side surfaces 32 and 34, respectively. Therefore, the electric track width of the SAL element is entire element width.

Figure 1B:
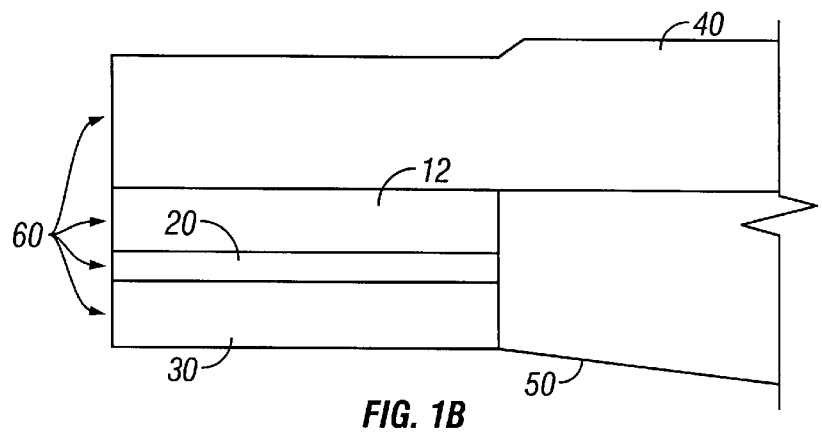

Now refer to FIG. 1b that shows cross-section view taken along line AA indicated in FIG. 1a. Function of insulator films 50 is to prevent electric connection from MR 10 to SAL 30. Numeral 60 designates an air-bearing surface (ABS).

Figure 2:
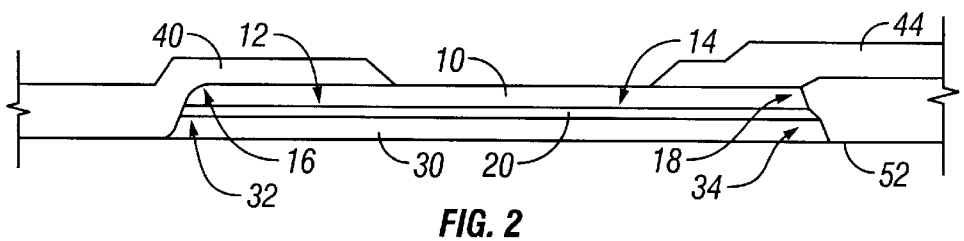
FIG. 2 is a diagram of an alternative embodiment of the invention.

In the following drawings, similar parts to those in FIG. 1 are designated by the same numerals as those used in FIG. 1. FIG. 2 shows an alternative embodiment of the present invention. MR layer 10 and SAL 30 are separated by a thin insulating spacer 20. MR layer 10 and SAL 30 are electrically connected at only one end region of the MR element. In this embodiment, no electric current passes through the SAL element. However, the whole SAL element is in an equal electric potential to that of one side of the MR element. One side region of the longitudinal bias layer and the leader layer does not electrically contact with a corresponding SAL end region. Insulator films 52 are electrically connected between MR layer 10 and SAL 30 at one end of the trilayer device."

FIG. 3 shows test results of the electric-pop noise before and after connection of MR layer 10 and SAL 30 under test conditions: trigger level=75 μV, threshold level=(Noise amplitude of Is=5 mA)+60 μV, and read current=12 mA.

Figure 3A:
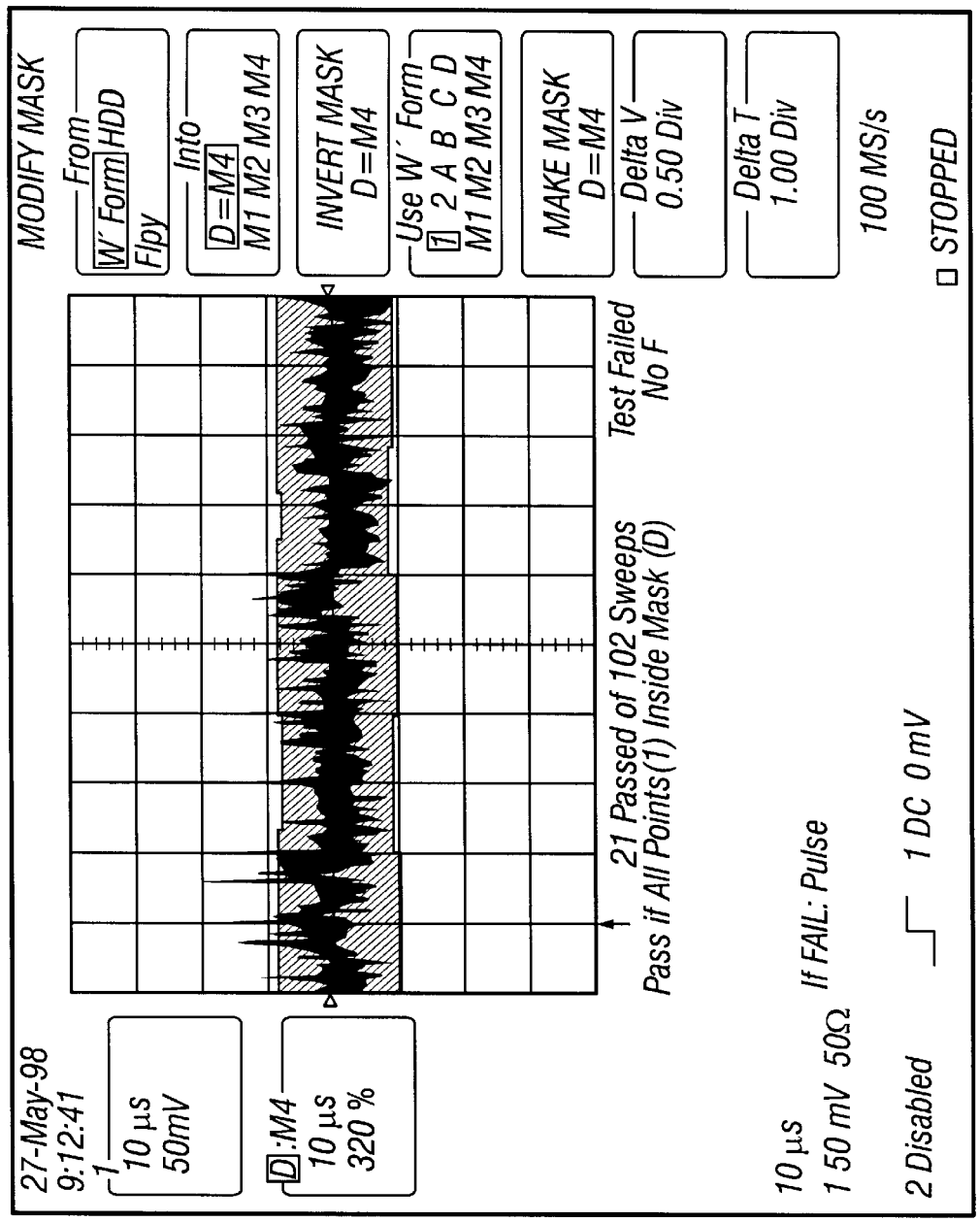
FIG. 3 shows electric-pop test results before and after MR and SAL are connected by microfabrication.
Figure 3B:
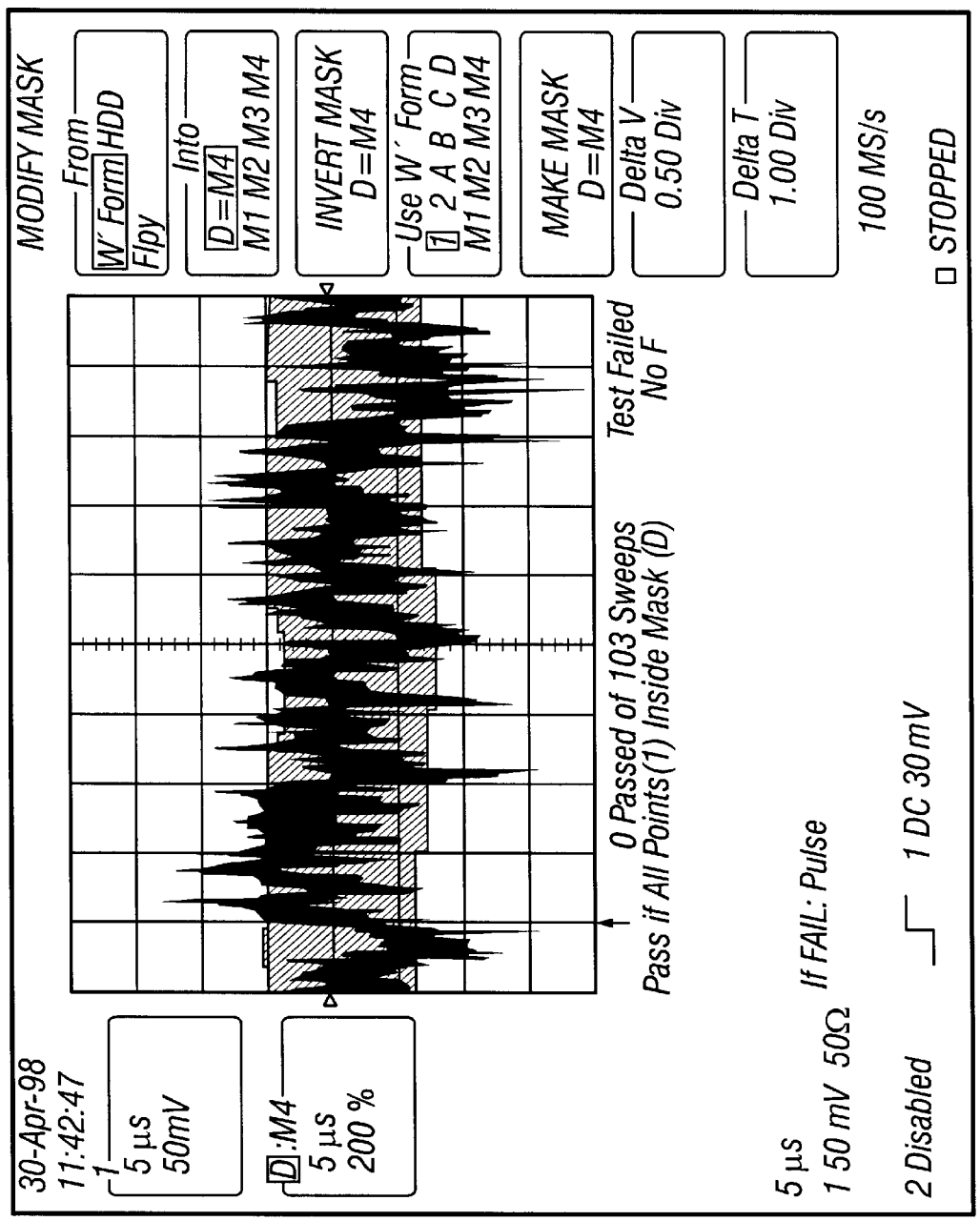
Figure 3C:
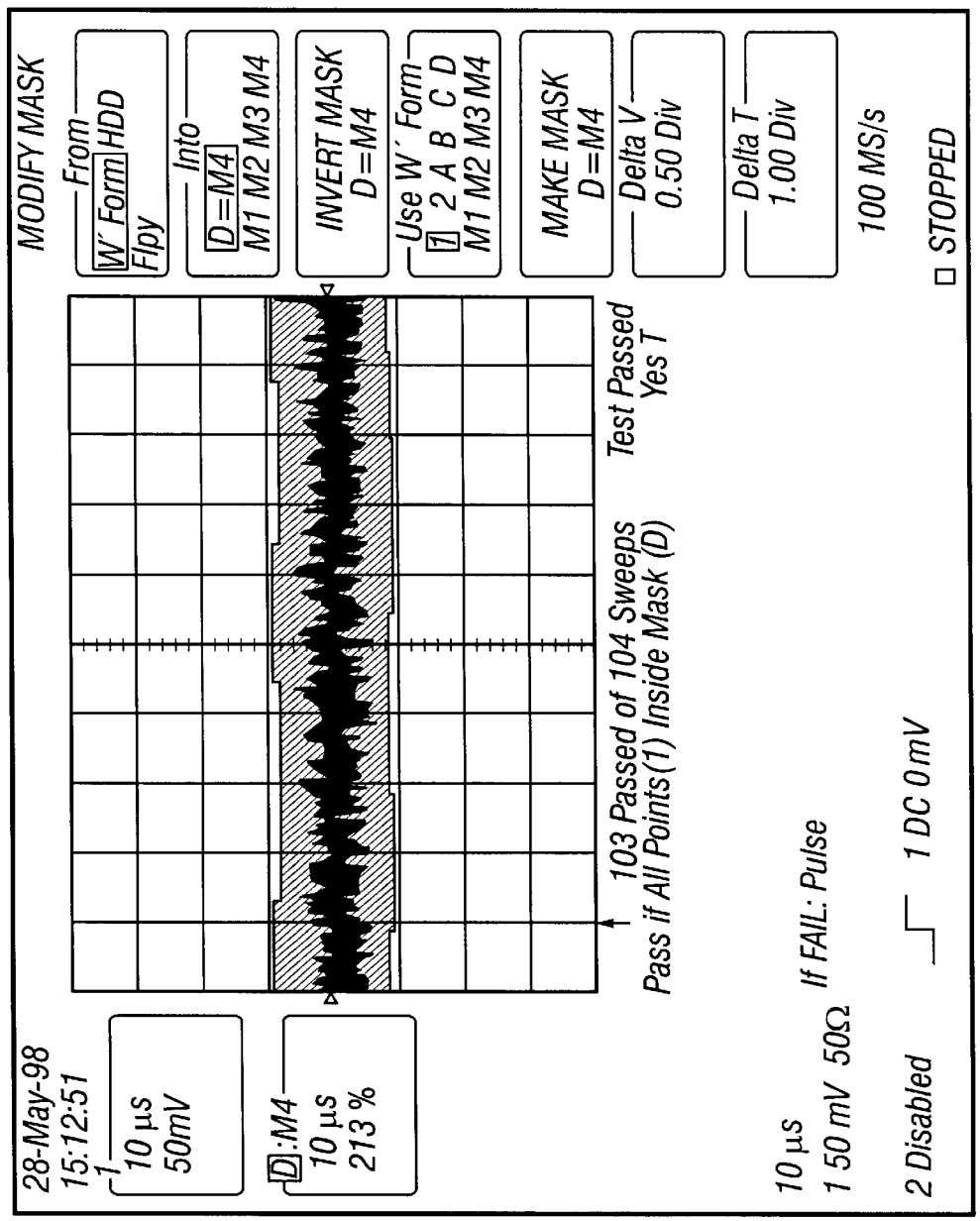
Figure 3D:
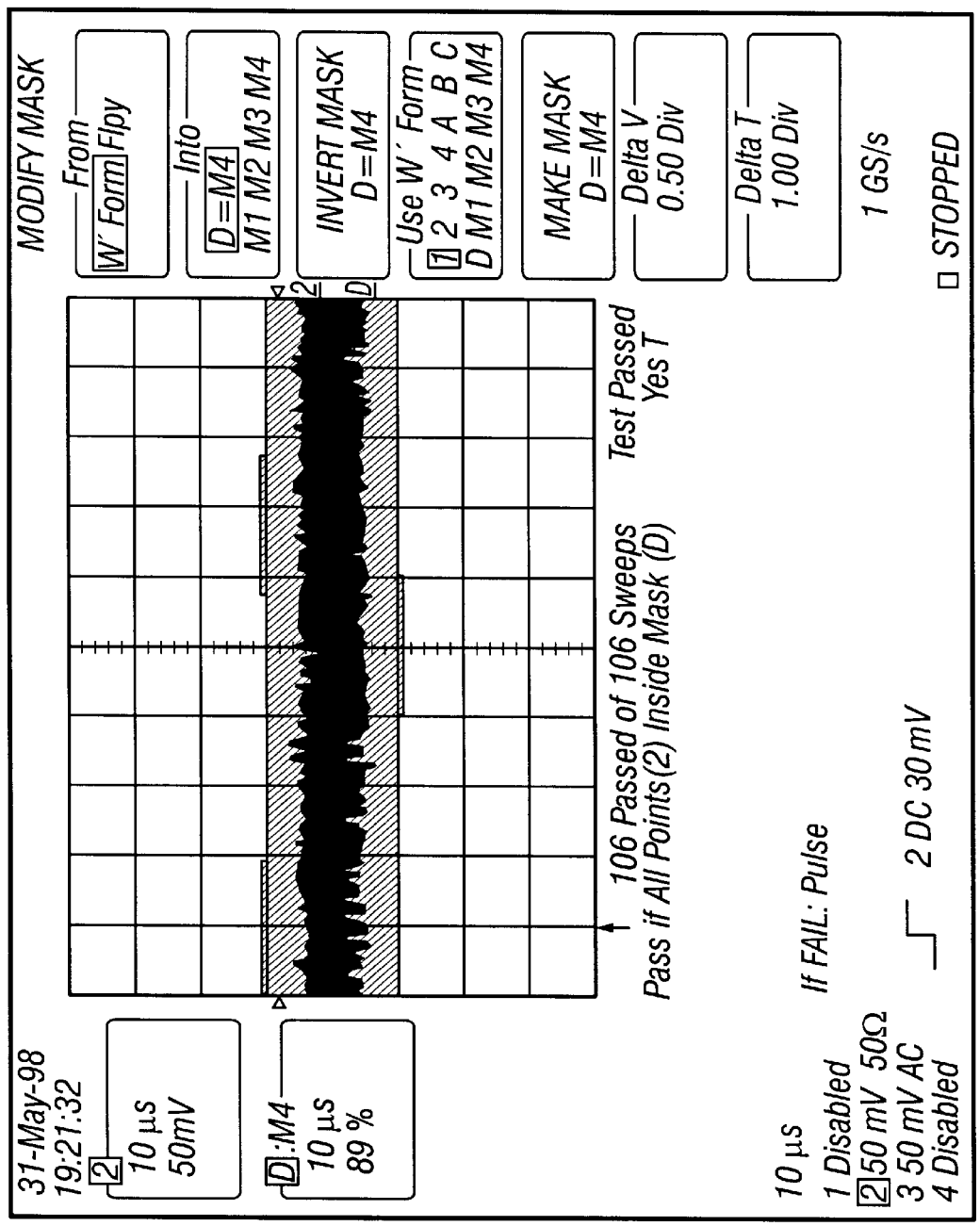

FIGS. 3a and 3b show electric-pop noise spectra of the device before edge shorting of the MR and SAL element, and FIGS. 3c and 3d show the same of the device after edge shorting of the MR and SAL element.

FIG. 4 shows an extension to prevent a MR/GMR device from electric-pop noise due to discharge between the MR/GMR device and shields.

Figure 4A:
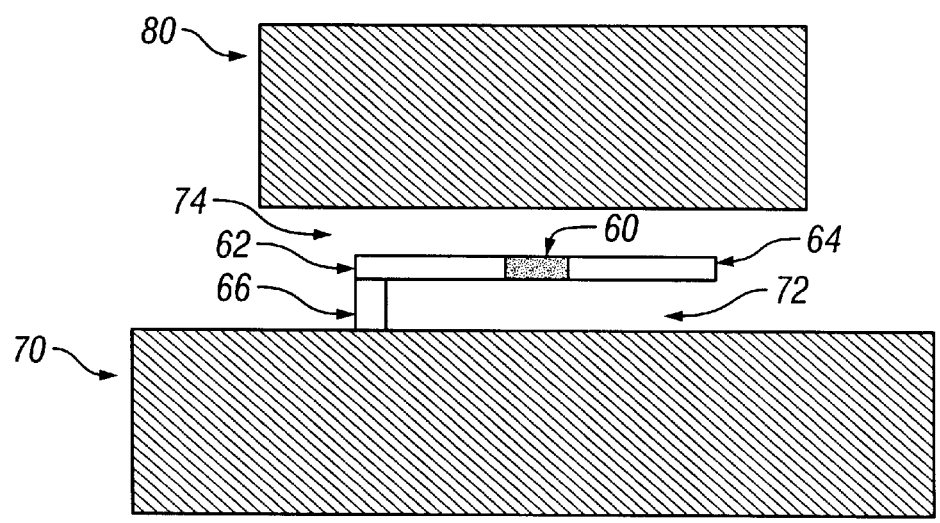
FIG. 4 shows an extension to prevent a MR/GMR device from electric-pop noise due to discharge between the MR/GMR device and shields.

"FIG. 4a is a diagram of a GMR device that is electrically shorted to a bottom shield to prevent electric-pop noise due to static discharge between the GMR device and a bottom shield."

Figure 4B:
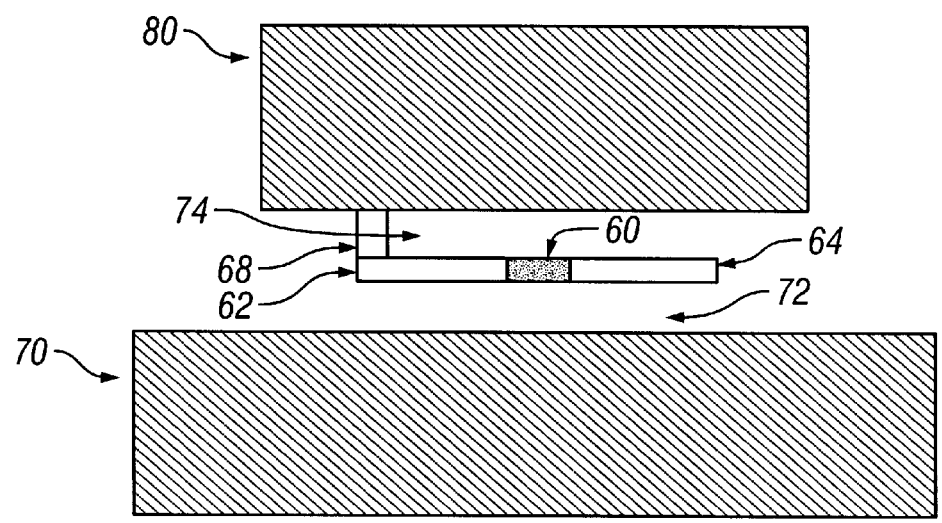

"FIG. 4b is a diagram of a GMR device that is electrically shorted to a top shield to prevent electric-pop noise due to static discharge between the GMR device and a top shield."

In FIGS. 4a and 4b, reference numeral 60 designates an AMR or a GMR active device, the GMR device including a spin-valve, GMR multilayer, and spin-dependent tunneling device, and numerals 62 and 64 designate a longitudinal bias layer and a lead layer, respectively. Electric contact 66 is provided between one side of lead layer 64 and of longitudinal bias layer 62 and the bottom shield 70. Bottom and top shields 70 and 80 are made of soft magnetic materials, such as NiFe. Gaps 72 and 74 are filled with electrically insulating materials, such as $Al_2O_3$, AlNO, AlN, and vary from 250 to 2000 Å in thickness. Electric contact 68 is provided between one side of lead layer 64 and of longitudinal bias layer and top shield 80.

Operational principle of the present invention is explained as follows.

Signal amplitude of the AMR device is given by equation:

$$\Delta V_{pp} = MrW * J_{MR} * \Delta\rho * \frac{R_{SAL}*(\sin^2\theta - \sin^2\theta_0)}{(R_{MR}+R_{SAL})} \quad (1)$$

where $\Delta V_{pp}$: peak-to-peak amplitude (V),

MrW: MR read track width (μm), $J_{MR}$: current density passing through the MR device film (A/m$^2$), $\Delta\rho$: magnetoresistive coefficient of resistivity of the MR layer (Ω.m), $$\frac{R_{SAL}}{(R_{MR}+R_{SAL})}:$$

voltage shunting factor, $R_{MR}$: sheet resistance of the MR layer (Ω), ($R_{MR}+R_{SAL}$): sheet resistance of the SAL layer (Ω), and ($\sin^2\theta - \sin^2\theta_0$): sensitivity function of the MR device.

For the same operating current I, there is a signal enhancement by a factor of square of $(R_{MR}+R_{SAL})/R_{SAL}$ comparing an AMR device without a current flowing through SAL to that with a current shunting through the SAL. In a typical AMR device, the shunt factor $R_{SAL}/(R_{MR}+R_{SAL})$ is as much as 0.7.

In the case of a SAL electrically isolated from the MR element, the SAL is electrically floating, which could result in electric-pop noise due to static discharge between the MR and SAL. In the invention illustrated in FIG. 1, we let a small percentage of current flow through the SAL. The way to achieve it is to provide electric contact to the SAL at the end of the element. With such configuration, the SAL is no longer electrically floating as there is a small amount of current flowing through the SAL. The shunting factor is determined by equation:

$$\frac{R_{SAL}*L_{SAL}}{R_{MR}*W_{MR}+R_{SAL}*L_{SAL}} \quad (3)$$

where $R_{SAL}$: sheet resistance of the SAL, $R_{MR}$: sheet resistance of the MR layer, $L_{SAL}$: length of the SAL, and $W_{MR}$: electric trick width of the MR layer.

We can tune the current ratio by simply adjusting element height and length. For reference, current MR/SAL sheet resistance is about 3/7. We can get 2% of current flowing through the SAL by setting width of the MR element at 20 μm assuming that our physical read track width is at 1 μm. This shunt ratio renders such a device have much higher signal than that of conventional SAL-biased AMR heads with a conducting spacer.

An alternative approach taught in FIG. 2 is to electrically connect one end of the SAL to the MR element. In this case, the SAL layer keeps the same electrical potential as that of one terminal of the AMR device and is no longer electrically floating. The advantage of this approach is to eliminate the current shunting through the SAL while preventing the SAL from electrically floating. By doing this, we can effectively eliminate charges building up in the SAL so that the electric-pop noise in the MR device is prevented.

Similar concept is used to short a MR/SV (spin valve) GMR device to either a top or bottom shield. By doing this, we can prevent the electric-pop noise due to static discharge between the MR/GMR device and shields. It must be pointed out that such electric-pop noise is a fundamental technology challenge for future higher density recording.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic recording head, comprising:
   a magnetoresistive layer having a first end and a second end;
   a soft-adjacent magnetic transverse bias layer (SAL) having a first end and a second end;
   an insulating layer arranged between said magnetoresistive layer and said SAL;
   a first conductive layer physically contacting a top surface and said first end of said magnetoresistive layer and said first end of said SAL;
   a second conductive layer physically contacting a top surface and said second end of said magnetoresistive layer and said second end of said SAL;
   the magnetoresistive layer supporting a first current path between the first and second conductive layers; and
   the SAL supporting a second current path between the first and second conductive layers;
   wherein the second current path is substantially longer than the first current path.

2. The magnetic recording head of claim 1, wherein said first current path passes through an active region in said magnetoresistive layer.

3. The magnetic recording head of claim 2, wherein said first conducting layer includes an extending portion on a top surface of said magnetoresistive layer, and said second conducting layer includes an extending portion on said top surface of said magnetoresistive layer, said active region being formed between said first conducting layer extending portion, said magnetoresistive layer, and said second conducting layer extending portion.

4. The magnetic recording head of claim 1, wherein said second electrical path is 3 to 25 times longer than that of said active region.

5. The magnetic recording head of claim 1, wherein thickness of said magnetoresistive layer is more than 50 Å and less than 400 Å.

6. The magnetic recording head of claim 1, wherein thickness of said SAL is less than 500 Å, and the moment ratio of said SAL to said magnetoresistive layer ranges from 0.6 to 1.0.

7. The magnetic recording head of claim 1, wherein said insulating layer ranges from 50 Å to 200 Å in thickness.

8. The magnetic recording head of claim 7, wherein said insulating layer is formed of $Al_2O_3$.

9. The magnetic recording head of claim 1, wherein the current ratio of said SAL and said magnetoresistive layer is adjusted by varying a width of said SAL.

* * * * *